United States Patent [19]

Yang

[11] Patent Number: 5,606,492

[45] Date of Patent: Feb. 25, 1997

[54] INTERMITTENT ON/OFF REGULATOR TYPE DC POWER SUPPLY

[76] Inventor: Tai-Her Yang, No. 32 Lane 29, Taipin St., Si-Hu Town Dzan-Hwa, Taiwan

[21] Appl. No.: 650,256

[22] Filed: May 22, 1996

Related U.S. Application Data

[63] Continuation-in-part of Ser. No. 317,631, Oct. 3, 1994, abandoned.

[51] Int. Cl.⁶ .............................. H02M 5/42; H02M 7/04; H02M 7/68
[52] U.S. Cl. ................................ 363/86; 363/79
[58] Field of Search .................... 363/16, 20, 21, 363/37, 56, 85, 86, 79

[56] References Cited

U.S. PATENT DOCUMENTS

| | | | |
|---|---|---|---|
| 3,736,495 | 5/1973 | Calkin et al. | 323/17 |
| 4,307,332 | 12/1981 | Lorenzo et al. | 323/246 |
| 4,734,634 | 3/1988 | Kito et al. | 318/778 |
| 5,144,544 | 9/1992 | Jenneve et al. | 363/21 |
| 5,200,690 | 4/1993 | Uchida | 320/20 |
| 5,202,819 | 4/1993 | Min | 361/436 |
| 5,208,432 | 5/1993 | Han | 219/10.55 B |
| 5,396,411 | 3/1995 | Konishi et al. | 363/37 |

Primary Examiner—Peter S. Wong
Assistant Examiner—Bao Q. Vu
Attorney, Agent, or Firm—Bacon & Thomas

[57] ABSTRACT

An intermittent on/off regulator type DC power supply circuit having low noise and low losses includes a voltage detector at the power source side of the circuit and/or a current detector at the load side of the circuit which feeds back voltage and or current values to a central controller and intermittently cuts off the input or output of a transformer or rectifier whenever preset voltage or current levels are exceeded thereby preventing, for example, overcharging of a battery.

6 Claims, 3 Drawing Sheets

INTERMITTENT ON/OFF REGULATOR TYPE DC POWER SUPPLY

This application is a Continuation-in-Part of application Ser. No. 08/317,631, filed Oct. 3, 1994 now abandoned.

SUMMARY OF THE INVENTION

The intermittent on/off regulator type DC power supply circuit of the invention is an innovative low noise and low loss voltage regulator circuit design for correcting unstable power source conditions, by regulating control of the charging current to the battery in intermittent on/off fashion based on the voltage variation quantity. The invention can be applied in charging circuits to prevent the battery from being overcharged, or applied in regulating the output power of other DC loaded circuits.

DETAILED DESCRIPTION OF THE PREFERRED EMBODIMENTS

In a conventional charging circuit, solid state switching components are usually adopted to control the AC side conduction phase angle and thereby deal with voltage variation of the power source, but the conventional circuit can cause communication system interference due to the phase control noise, a problem that is particularly serious in large power cases. In contrast, the preferred intermittent on/off regulator type DC power supply circuit operates by detecting the current/voltage variation quantity at the power source side or detecting the output current variation at the loaded side to intermittent on/off control the drive switch installed between the transformer and the power source, thereby to further regulate the secondary output side DC power source average output value.

Figure 1:
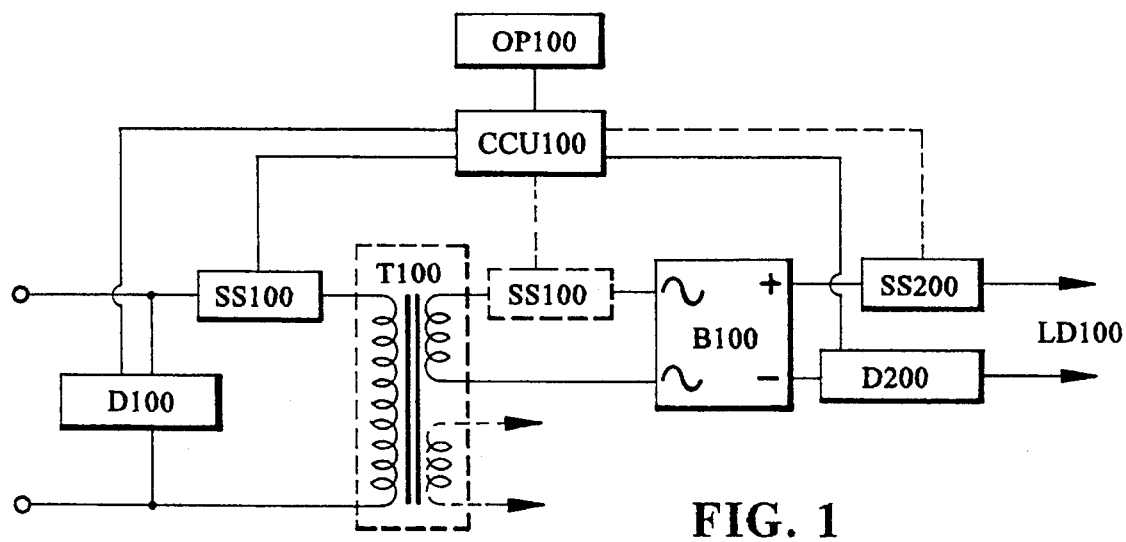
FIG. 1 is a block diagram showing basic principles of the invention.
Figure 2:
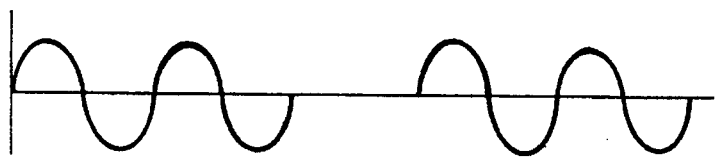
FIG. 2 is a waveform diagram showing intermittent conduction.
Figure 3:
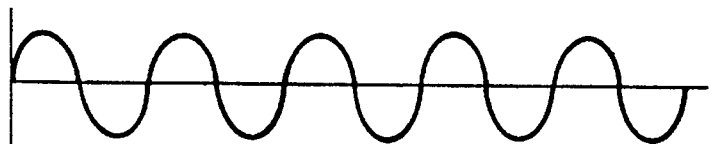
FIG. 3 is a waveform diagram showing continuous conduction.

FIG. 1 is a block diagram showing basic principles of the invention, which is mainly comprised of the following:

A transformer T100, which may be a single phase or multiphase self-coupled or separated winding type transformer, wherein its secondary output side can provide one or more than one outputs;

A rectifier B100 in the form of a rectifier component to provide DC output through the transformer secondary output side voltage input and which can be full wave rectified by a bridge circuit or a control type transformer, or it can be a half wave rectified;

A load LD100 for supplying power to a battery or to other loads using DC power, or to the DC voltage regulator circuit between loads;

A voltage detector D100 installed at the primary input side to detect the power source voltage and transfer the signal to the central controller CCU100;

A current detector D200 series combined at the secondary output side (or the primary input side) to randomly detect the output current and transfer the signal to the central controller CCU100;

A drive switch SS100 in the form of a bi-directional switching device comprised of electromechanical or solid state switches, which is controlled by the central controller CCU100 to perform ON/OFF operations (over-zero switching control is possible for the solid state components), and which can be installed between the primary input side of the transformer winding and the power source or between the secondary output side winding and the rectifier B100; or a drive switch SS200 embodied by bi-directional or one-directional conductive electromechanical or solid state switching components which can be installed between the rectifier B100 and the load LD100;

A central controller CCU100 comprised of solid state or electromechanical type logic or linear components, and has the functions described below;

An operating unit OP100 which receives the manual or signal commands and send input commands of control response values on load current and power source voltage to CCU100;

The functions of CCU100 are as follows:

I. The voltage setting value is compared with the feedback signal from the voltage detecting device to control the drive switch to perform the following corresponding operations:
  1. If the detected voltage is higher than the voltage setting value, then the drive switch is operated to intermittently conduct and cut off the circuit, thereby to regulate the average voltage value to equal or close to the voltage setting value, with FIG. 2 showing an example of the intermittent conduction waveform.
  2. If the detected voltage value is equal to or lower than the voltage setting value, then the drive switch is operated to continuous conduction, with FIG. 3 showing an example of the continuous conduction waveform.

II. The current setting value is compared with the feedback value of the current detector to perform the following corresponding operations:
  1. If the detected current value is larger than the setting value, then the drive switch is intermittently conducted and cut off to regulate the average current value to be equal or close to the setting value.
  2. If the detected current value is equal to or lower than the current setting value, then the drive switch is operated to continue conduction.

III. If functions I and II are installed together, then when the detected voltage or current exceeds the setting value, the drive switch is intermittently conducted and cut off to regulate the average value whenever the voltage or current exceeds its setting upper limit.

The intermittent on/off regulator type DC power supply circuit can be applied by installing the voltage detector for the voltage setting function or by installing the current detector for the current setting function, or installing the two detector types together for setting both functions.

Figure 4:
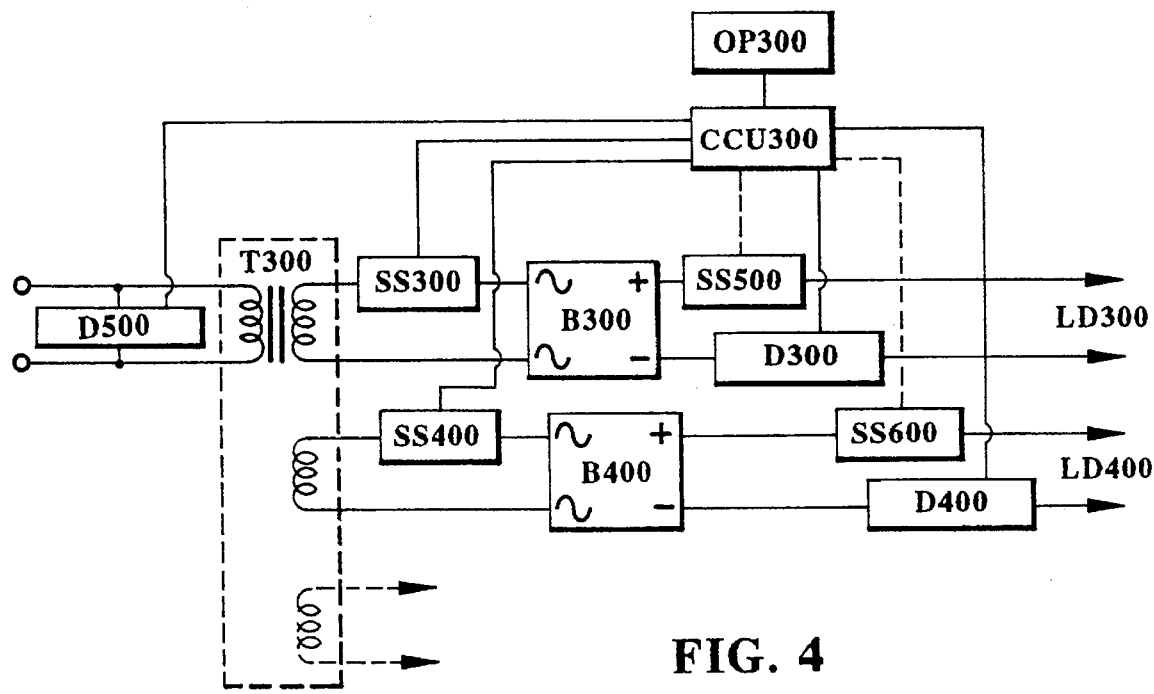
FIG. 4 shows a preferred embodiment of a circuit having multiple and independently regulated outputs.

The embodiment of FIG. 1 can be further expanded to multiple individually and independently regulated output type circuits. FIG. 4 shows a first embodiment of a circuit having multiple individually independent regulated outputs.

The voltage detector can include prior art arrangements such as sampling by a potentiometer, and a prior art arrangement such as sampling by a capacitive resistor-integrator can be adopted for the current detector.

The embodiment of FIG. 4 is different from the embodiment of FIG. 1 in the following respects:

The transformer T300 has individual secondary windings respectively connected to the individual rectifiers B300 and B400, whereby each drive switch SS300 and SS400 is comprised of electromechanical or solid state bi-directional switching components, and are respectively installed between the individual secondary winding and the rectifiers B300 and B400; or the drive switch is constituted by multiple independent electromechanical or solid state one-directional (or bi-directional) switching components SS500 and SS600 respectively installed between the output terminal of the rectifiers B300 and B400 and the individual loads LD300 and LD400, such that each output current detector D300 and D400 respectively feeds back signals to CCU100 following loading while the common voltage detector D500 provides detection of the common power source voltage, with the load output control functions of CCU300 being dependent upon operating commands input through OP300 for the individual loads.

Figure 5:
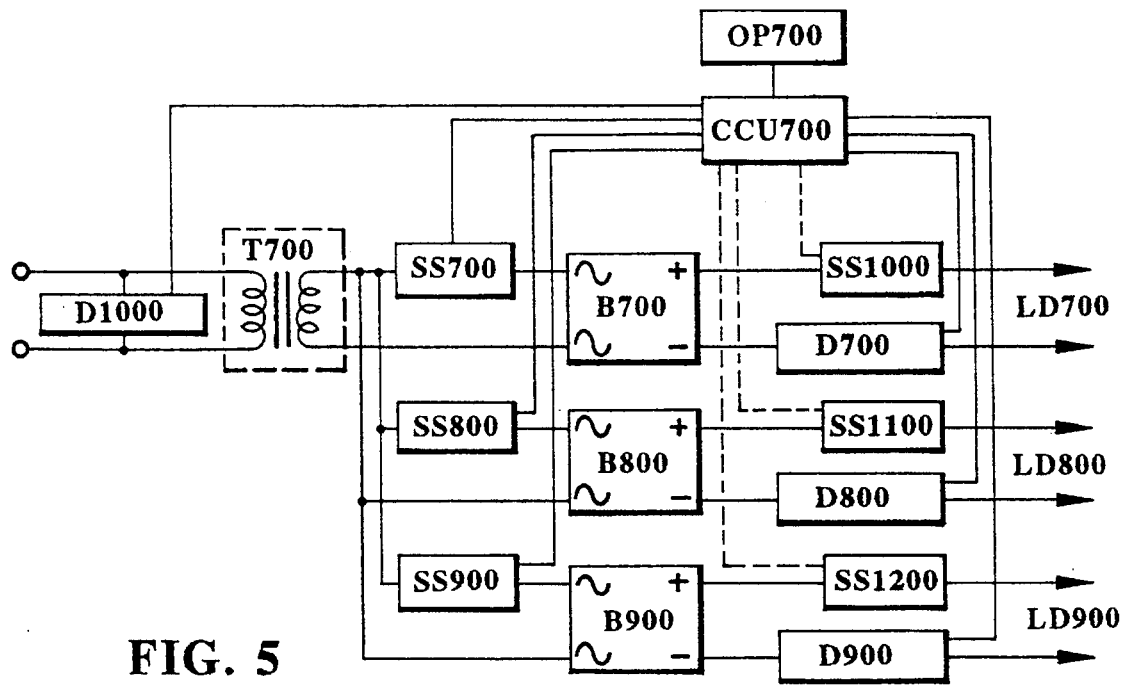
FIG. 5 shows a second preferred embodiment of a circuit having multiple individually and independently regulated outputs.

FIG. 5 shows a second embodiment of a power supply circuit having multiple individually and independently regulated outputs, which differs from the embodiment of FIG. 1 in the following respects:

The multiple individually and independently regulated rectifiers B700, B800, and B900 have a common secondary winding: i.e. the multiple drive switches SS700, SS800, and SS900 are respectively comprised of electromechanical or solid state bi-directional components, while each is respectively installed between the common secondary winding and the individual rectifiers B700, B800, and B900; or the drive switches are respectively comprised of the multiple independent electromechanical or solid state-one-direction or bi-directional switching components SS1000, SS1100, and SS1200 and are respectively installed between the output terminals of the rectifiers B700, B800, and B900 and the individual loads LD700, LD800, and LD900 such that each output current detector D700, D800, and D900 respectively feeds back signals to CCU700 following loading, while the common voltage detector D1000 provides detection of the common power source voltage, with the load output control functions of CCU700 being dependent upon the operating commands through OP700 for the individual loads.

Figure 6:
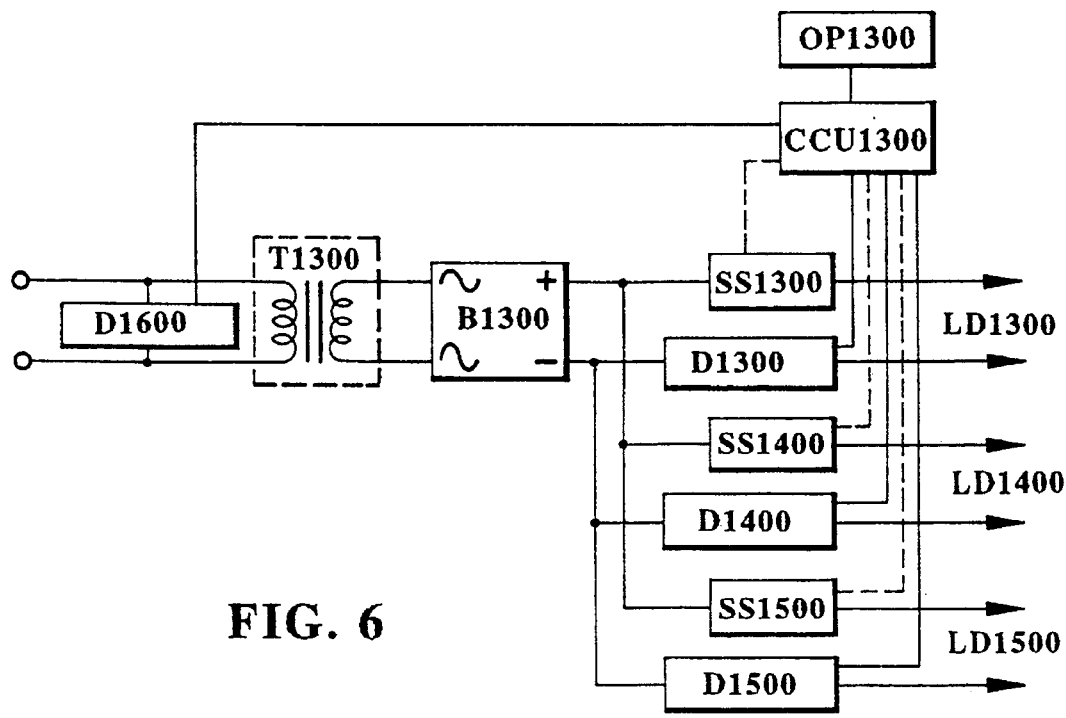
FIG. 6 shows a third preferred embodiment of a circuit having multiple individually and independently regulated outputs.

FIG. 6 shows a third embodiment of a power supply circuit having multiple individually and independently regulated outputs, and is different form the embodiment of FIG. 1 in the following respects:

The drive switches SS1300, SS1400, and SS1500 have multiple independent outputs and have a common secondary winding and a common rectifier B1300: i.e., the drive switches are respectively constituted by the multiple independent electromechanical or solid state one-directional or bi-directional switching components, while each is series combined between the common rectifier B1300 and the individually independent loads LD1300, LD1400, and LD1500, with the individual load output control functions being the same as in the embodiment of FIG. 1;

The operating unit OP1300 receives manual or signal commands and sends input commands of control response values on load current and power source voltage to CCU1300, which also receives current signals from current detectors D1300, D1400, and D1500, and voltage detector D1600 at the input of transformer T1300.

If the rectifier mentioned in the above examples is embodied by rectifying components capable of performing switching control (such as an SCR or other one-directional operated solid state switching components), then it can be directly utilized as a substituted for the drive switching component SS220 at the output side.

Figure 7:
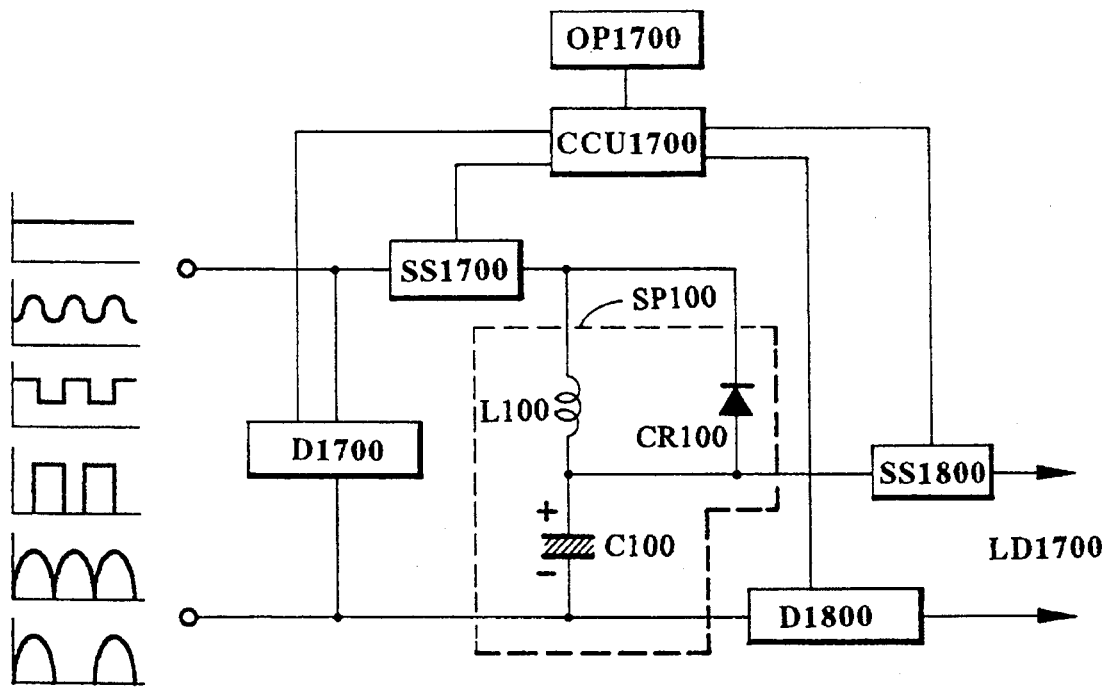
FIG. 7 is a block diagram showing steady or pulsed DC to DC control principles of the invention.

In addition, the primary side power source of the intermittent on/off regulator type DC power supply circuit system of the first preferred embodiment can further be directly substituted by DC power to achieve a steady or pulsed DC to DC power supply, as illustrated in FIG. 7. This embodiment is mainly comprised of the following:

A primary side DC power source supplied by a DC generator, battery, solar cell, or by rectifying the AC-current the primary side DC power source supplying either a steady DC waveform or a pulsed DC waveform;

A load LD1700 which supplies power to a battery or to other loads using DC power, or to the DC voltage regulator circuit between loads;

A voltage detector D1700 installed at the primary input side to detect the power source voltage and transfer the signal to the central controller CCU100;

A current detector D1800 which is series combined at the secondary output side (or the primary input side) to randomly detect the output current and transfer the signal to the central controller CCU1700;

A drive switch SS1700 comprised of electromechanical or solid state switches and controlled by the central controller CCU1700 to perform ON/OFF switching operations, and which can be installed between the primary DC power side and the energy charging/discharging device SP100;

An energy charging/discharging device SP100 comprised of an inductor L100 is series combined with capacitor C100 and connected to the primary DC power source side to be controlled by the drive switch SS100, wherein both ends of the inductor L100 can be selected based on the load property to be parallel combined with a reverse flywheel diode CR100, while both ends of the capacitor C100 are used as the output terminals for series combination with a current detector D200 between the load LD100 and the capacitor, and if a drive switch SS1800 constituted by electromechanical or solid state components is utilized, the drive switch SS1800 can be series combined between the load output and the capacitor;

A central controller CCU1700 which provides the load control function outputs to each load based on operating commands from operating unit OP1700 and which receives the feedback signal from the current detector D1800 and the detecting signal from the common voltage detector D1700 on the common power source voltage;

An operating unit OP1700 which receives the manual or signal commands and send input commands of control response values on load current and power source voltage to CCU1700.

The central control functions of this embodiment are the same as in the embodiment of FIG. 1.

I claim:

1. An intermittent on/off regulator type DC power supply circuit for detecting a current/voltage variation at a power source side of the circuit or an output current variation at a load side of the circuit, and intermittently on/off controlling a drive switch installed between a transformer and a power source, thereby regulating a secondary output side DC power source average output value, comprising:

a transformer having at least one secondary output;

a rectifier connected to said secondary output of the transformer;

a load connected to an output of the rectifier;

one of a voltage detector installed at a primary input side of the transformer to detect a power source voltage and send a signal representative of the power source voltage to a central controller and a current detector installed at an output side of the rectifier to detect an output current and send a signal representative of the output current to the central controller;

a drive switch connected to the central controller and controlled thereby, said drive switch being installed between one of the primary input side of the transformer, the secondary output side of the transformer, and the load;

a central controller; and an operating unit for inputting commands to the central controller relating to response values for the load current and power source voltage, wherein the central controller forms a means for performing the following functions, depending on whether the voltage detector or current detector is installed, respectively at the input side of the transformer and at the output of the rectifier:

I. comparing a voltage setting value input by the operating unit with the signal sent by the voltage detecting device and controlling the drive switch based on the comparison of the voltage setting value and the signal sent by the voltage detecting device as follows:

(i) if the detected voltage is higher than the voltage setting value, operating the drive switch to intermittently conduct and cut off an output to the load such that an average voltage value of the output is approximately equal to the voltage setting value;

(ii) if the detected voltage value is approximately equal to the voltage setting value, operating the drive switch to continuously conduct;

II. comparing a current setting value input by the operating unit with the signal sent by the current detecting device and controlling the drive switch based on the comparison between the current setting value and the signal sent by the current setting device, as follows:

(i) if the detected current is higher than the current setting value, operating the drive switch to intermittently conduct and cut off an output to the load such that an average current value of the output is approximately equal to the current setting value;

(ii) if the detected current value is approximately equal to the current setting value, operating the drive switch to continuously conduct; and III. comparing the voltage and current setting values input by the operating unit with the respective signals sent by the voltage and current detecting devices and controlling the drive switch based on the comparison between the voltage and current setting values and the signals sent by the voltage and current setting devices, as follows:

(i) if the detected voltage or current is higher than the respective voltage or current setting value, operating the drive switch to intermittently conduct and cut off an output of the circuit such that an average voltage or current value of the output is approximately equal to the voltage or current setting value;

(ii) if the detected voltage or current value is approximately equal to the respective voltage or current setting value, operating the drive switch to continuously conduct, whereby the power supply circuit is intermittently operated based on feedback from the voltage detector, current detector, or both the voltage and current detectors.

2. A power supply circuit as claimed in claim 1, further comprising:

a second transformer secondary output;

a second rectifier connected to said second transformer secondary output;

a second load connected to an output of the second rectifier;

a second current detector installed at an output side of the second rectifier to detect a second output current and send a signal representative of the second output current to the central controller; and a second drive switch connected to the central controller and controlled thereby, said second drive switch being installed between the second transformer secondary output and the second rectifier, or between the second rectifier and the second load, wherein the central controller additionally forms a means for comparing a second current setting value input by the operating unit with the signal sent by the second current detecting device and controlling the second drive switch based on the comparison between the second current setting value and the signal sent by the second current setting device, as follows:

(i) if the current detected by the second current detecting device is higher than the second current setting value, operating the second drive switch to intermittently conduct and cut off an output to the second load such that an average current value of the output to the second load is approximately equal to the current setting value; and (ii) if the current detected by the second current detecting device is approximately equal to the second current setting value, operating the second drive switch to continuously conduct.

3. A power supply circuit as claimed in claim 1, further comprising:

a second rectifier connected to said secondary output of the transformer;

a second load connected to an output of the second rectifier;

a second current detector installed at an output side of the second rectifier to detect a second output current and send a signal representative of the second output current to the central controller; and a second drive switch connected to the central controller and controlled thereby, said second drive switch being installed between the secondary output of the transformer and the second rectifier, or between the second rectifier and the second load, wherein the central controller additionally forms a means for comparing a second current setting value input by the operating unit with the signal sent by the second current detecting device and controlling the second drive switch based on the comparison between the second current setting value and the signal sent by the second current setting device, as follows:

(i) if the current detected by the second current detecting device is higher than the second current setting value, operating the second drive switch to intermittently conduct and cut off an output to the second load such that an average current value of the output to the second load is approximately equal to the current setting value; and (ii) if the current detected by the second current detecting device is approximately equal to the second current setting value, operating the second drive switch to continuously conduct.

4. A power supply circuit as claimed in claim 1, further comprising:

a second load connected to an output of said rectifier;

a second current detector installed between an output of the rectifier and the second load to detect a second output current and send a signal representative of the second output current to the central controller; and a second drive switch connected to the central controller and controlled thereby, said second drive switch being installed between the second rectifier and the second load, wherein the central controller additionally forms a means for comparing a second current setting value input by the operating unit with the signal sent by the second current detecting device and controlling the second drive switch based on the comparison between the second current setting value and the signal sent by the second current setting device, as follows:

(i) if the current detected by the second current detecting device is higher than the second current setting value, operating the second drive switch to intermittently conduct and cut off an output to the second load such that an average current value of the output to the second load is approximately equal to the current setting value; and (ii) if the current detected by the second current detecting device is approximately equal to the second current setting value, operating the second drive switch to continuously conduct.

5. A DC-DC power supply circuit for detecting a current/voltage variation at a power source side of the circuit or an output current variation at a load side of the circuit, and intermittently on/off controlling a drive switch installed between a DC power source and an energy charging/discharging device, thereby regulating a DC power source average output value, comprising:

a primary side DC power source;

a charging/discharging device connected to the DC power source, said charging discharging device including an inductor having a first end connected to the primary DC power source and a second end connected to a first end of a capacitor, a second end of the capacitor being also connected with the primary DC power source, wherein the ends of the inductor are further connected to a reverse flywheel diode;

a load connected between the ends of the capacitor;

one of a voltage detector installed in parallel between the DC power source and the charging/discharging circuit to detect a power source voltage and send a signal representative of the power source voltage to a central controller and a current detector installed at an output side of the charging/discharging circuit to detect an output current and send a signal representative of the output current to the central controller;

a drive switch connected to the central controller and controlled thereby, said drive switch being installed at one of an output of the primary DC power source and an output of the charging/discharging circuit;

a central controller; and an operating unit for inputting commands to the central controller relating to response values for the load current and power source voltage, wherein the central controller forms a means for performing the following functions, depending on whether the voltage detector or current detector is installed, respectively at the input side of the transformer and at the output of the rectifier:

I. comparing a voltage setting value input by the operating unit with the signal sent by the voltage detecting device and controlling the drive switch based on the comparison of the voltage setting value and the signal sent by the voltage detecting device as follows:

(i) if the detected voltage is higher than the voltage setting value, operating the drive switch to intermittently conduct and cut off an output to the load such that an average voltage value of the output is approximately equal to the voltage setting value;

(ii) if the detected voltage value is approximately equal to the voltage setting value, operating the drive switch to continuously conduct;

II. comparing a current setting value input by the operating unit with the signal sent by the current detecting device and controlling the drive switch based on the comparison between the current setting value and the signal sent by the current setting device, as follows:

(i) if the detected current is higher than the current setting value, operating the drive switch to intermittently conduct and cut off an output to the load such that an average current value of the output is approximately equal to the current setting value;

(ii) if the detected current value is approximately equal to the current setting value, operating the drive switch to continuously conduct; and III. comparing the voltage and current setting values input by the operating unit with the respective signals sent by the voltage and current detecting devices and controlling the drive switch based on the comparison between the voltage and current setting values and the signals sent by the voltage and current setting devices, as follows:

(i) if the detected voltage or current is higher than the respective voltage or current setting value, operating the drive switch to intermittently conduct and cut off an output of the circuit such that an average voltage or current value of the output is approximately equal to the voltage or current setting value;

(ii) if the detected voltage or current value is approximately equal to the respective voltage or current setting value, operating the drive switch to continuously conduct, whereby the power supply circuit is intermittently operated based on feedback from the voltage detector, current detector, or both the voltage and current detectors.

6. A DC-DC power supply circuit as claimed in claim 5, wherein the primary side DC power source is selected from the group consisting of a steady DC power source and a pulsed DC power source.

* * * * *